US010462161B2

(12) United States Patent
Carlesimo

(10) Patent No.: US 10,462,161 B2
(45) Date of Patent: Oct. 29, 2019

(54) VEHICLE NETWORK OPERATING PROTOCOL AND METHOD

(71) Applicant: GM GLOBAL TECHNOLOGY OPERATIONS LLC, Detroit, MI (US)

(72) Inventor: Daniel P. Carlesimo, Macomb Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 206 days.

(21) Appl. No.: 15/629,451

(22) Filed: Jun. 21, 2017

(65) Prior Publication Data

US 2018/0375879 A1 Dec. 27, 2018

(51) Int. Cl.
*H04L 29/06* (2006.01)
*H04L 12/40* (2006.01)
*H04W 12/12* (2009.01)
*H04W 4/48* (2018.01)

(52) U.S. Cl.
CPC ......... *H04L 63/1416* (2013.01); *H04L 12/40* (2013.01); *H04L 63/1425* (2013.01); *H04W 12/12* (2013.01); *H04L 2012/40215* (2013.01); *H04L 2012/40273* (2013.01); *H04W 4/48* (2018.02)

(58) Field of Classification Search
CPC .... G06F 11/27; G06F 11/142; G06F 11/0739; G06F 11/2002; G06F 11/0745; G06F 11/3027

See application file for complete search history.

(56) References Cited

U.S. PATENT DOCUMENTS

| 9,231,936 | B1 * | 1/2016 | Wang | H04L 63/08 |
| 2002/0194548 | A1 * | 12/2002 | Tetreault | G06F 11/0745 |
| | | | | 714/43 |
| 2012/0290870 | A1 * | 11/2012 | Shah | G06F 21/10 |
| | | | | 714/4.11 |
| 2013/0081106 | A1 * | 3/2013 | Harata | G06F 21/554 |
| | | | | 726/2 |
| 2013/0332925 | A1 * | 12/2013 | Motai | G06F 9/455 |
| | | | | 718/1 |
| 2015/0020152 | A1 * | 1/2015 | Litichever | H04L 63/14 |
| | | | | 726/1 |
| 2015/0220401 | A1 * | 8/2015 | Jiang | H04L 12/40013 |
| | | | | 714/23 |
| 2015/0239366 | A1 * | 8/2015 | Jestin | B60L 3/0046 |
| | | | | 307/10.1 |

(Continued)

FOREIGN PATENT DOCUMENTS

| WO | WO 2017/013622 A1 * | 1/2017 | | H04L 1/00 |
| WO | WO 2018/104929 A1 * | 6/2018 | | G05B 19/04 |

*Primary Examiner* — Christopher A Revak
(74) *Attorney, Agent, or Firm* — Lorenz & Kopf, LLP

(57) ABSTRACT

A communication network includes a plurality of nodes, wherein each of the nodes is operably connected to a bus. A transmitting node sends a data communication to a receiving node in accordance with a protocol. Each data communication contains information to be communicated within a data frame structure. The receiving node is configured to determine a compromised state of the transmitting node from data communication and to initiate a response method. The transmitting node disassociates from the bus in accordance with the detection trigger and coordinated response strategy.

20 Claims, 2 Drawing Sheets

(56) References Cited

U.S. PATENT DOCUMENTS

| | | | |
|---|---|---|---|
| 2015/0312123 A1* | 10/2015 | Zhang | G06F 11/0745 |
| | | | 709/224 |
| 2016/0321155 A1* | 11/2016 | Hirano | G06F 13/4022 |
| 2016/0378707 A1* | 12/2016 | Sikand | B60L 15/20 |
| | | | 713/189 |
| 2016/0381068 A1* | 12/2016 | Galula | H04L 63/123 |
| | | | 726/23 |
| 2017/0013005 A1* | 1/2017 | Galula | H04L 63/1425 |
| 2017/0295188 A1* | 10/2017 | David | H04L 63/0428 |
| 2018/0189483 A1* | 7/2018 | Litichever | H04L 67/2823 |
| 2018/0316699 A1* | 11/2018 | David | H04W 4/40 |
| 2018/0349612 A1* | 12/2018 | Harel | G06F 21/577 |
| 2019/0052654 A1* | 2/2019 | Juliato | H04L 63/1416 |
| 2019/0222595 A1* | 7/2019 | Giani | H04L 63/14 |
| 2019/0230119 A1* | 7/2019 | Mestha | G06N 20/00 |

\* cited by examiner

VEHICLE NETWORK OPERATING PROTOCOL AND METHOD

TECHNICAL FIELD

This patent generally relates to a communication network for a vehicle, and more particularly, this patent relates to a vehicle communication network and method providing active cyber attack response.

BACKGROUND

Vehicles are typically equipped with one or more controllers or control devices that are linked by at least one network or bus structure. It is common for a vehicle to have numerous electronic control units (ECUs) for various subsystems. Among the ECUs within a vehicle are, without limitation: powertrain/engine, active restraint (airbag), braking, chassis, body, infotainment, autonomous operation and the like. A controller area network (CAN) structure is a communication network structure that is frequently used in vehicles that allows ECUs communicatively coupled to the CAN network to communicate with each other without a host computer or master network control.

Virtually any computing device or communication structure can be subject to cyber attack. Generally speaking, a cyber attack is an offensive, malicious maneuver taken against a computing device or communication network to acquire information or data, to control the device or network, or to destroy or degrade the functionality of the device or network.

Vehicle manufacturers are increasingly aware of the need for cyber security to secure the vehicle computing devices and networks from cyber attack. These efforts typically take the form of securing the devices and networks from cyber intrusion by creating barriers to attack. However, even the best barriers, in time, may not always be able to stop the persistent efforts of the skilled hacker.

Preferable to an endless effort to block cyber attacks, is to actively address and counter the cyber attack. Accordingly, it is desirable to provide a communication network and a method of communicating data via a network that actively respond to identify and counter a cyber attack by making use of a mechanism independent of the ECU application software. It is further desirable to provide vehicles incorporating such protocols and methods instead of solely adopting the current ISO11898-1 based communication protocol solution, which has a fault confinement strategy intended to preserve high availability of the data transmission system without leveraging certain cyber security concerns. Furthermore, other desirable features and characteristics of the present disclosure will become apparent from the subsequent detailed description and the appended claims, taken in conjunction with the accompanying drawings and the foregoing technical field and background.

SUMMARY

In a non-limiting exemplary embodiment, a communication network includes a plurality of nodes, each of the nodes being operably connected to a bus. A transmitting node of the plurality of nodes is configured to communicate in accordance with a predetermined protocol a data communication having a predetermined frame structure via the bus to a receiving node of the plurality of nodes, which is configured to receive the data communication. Each data communication contains information to be communicated. The receiving node is configured to determine from the data communication a compromised state of the transmitting node and to initiate a response strategy. The transmitting node is configured to disassociate from the bus in accordance with the response strategy.

In another non-limiting exemplary embodiment, a communication network includes a plurality of nodes, each of the nodes being operably connected to a bus. A transmitting node of the plurality of nodes is configured to communicate in accordance with a predetermined protocol a data communication having a predetermined frame structure via the bus to a receiving node of the plurality of nodes, which is configured to receive the data communication. Each data communication contains information to be communicated. The receiving node is configured to determine from the data communication a compromised state of the transmitting node and to initiate a response strategy. The transmitting node is configured to disassociate from the bus in accordance with the response strategy, and the compromised state is the result of a cyber attack.

In another non-limiting exemplary embodiment, a communication network includes a plurality of nodes, each of the nodes being operably connected to a bus. A transmitting node of the plurality of nodes is configured to communicate in accordance with a predetermined protocol a data communication having a predetermined frame structure via the bus to a receiving node of the plurality of nodes, which is configured to receive the data communication. Each data communication contains information to be communicated. The receiving node is configured to determine from the data communication a compromised state of the transmitting node and to initiate a response strategy. The transmitting node is configured to disassociate from the bus in accordance with the response strategy by entering a bus off state.

In another non-limiting exemplary embodiment, a communication network includes a plurality of nodes, each of the nodes being operably connected to a bus. A transmitting node of the plurality of nodes is configured to communicate in accordance with a predetermined protocol a data communication having a predetermined frame structure via the bus to a receiving node of the plurality of nodes, which is configured to receive the data communication. Each data communication contains information to be communicated. The receiving node is configured to determine from the data communication a compromised state of the transmitting node and to initiate a response strategy. The transmitting node is configured to disassociate from the bus in accordance with the response strategy which includes the transmitting node incrementing an error counter.

In another non-limiting exemplary embodiment, a communication network includes a plurality of nodes, each of the nodes being operably connected to a bus. A transmitting node of the plurality of nodes is configured to communicate in accordance with a predetermined protocol a data communication having a predetermined frame structure via the bus to a receiving node of the plurality of nodes, which is configured to receive the data communication. Each data communication contains information to be communicated. The receiving node is configured to determine from the data communication a compromised state of the transmitting node and to initiate a response strategy. The transmitting node is configured to disassociate from the bus in accordance with the response strategy by incrementing an error counter.

In another non-limiting exemplary embodiment, a communication network includes a plurality of nodes, each of the nodes being operably connected to a bus. A transmitting node of the plurality of nodes is configured to communicate in accordance with a predetermined protocol a data communication having a predetermined frame structure via the bus to a receiving node of the plurality of nodes, which is configured to receive the data communication. Each data communication contains information to be communicated. The receiving node is configured to determine from the data communication a compromised state of the transmitting node and to initiate a response strategy. The transmitting node is configured to disassociate from the bus in accordance with the response strategy. The bus comprises a Controller Area Network (CAN) bus and the error counter is a transmission error counter (TEC).

In another non-limiting exemplary embodiment, a communication network includes a plurality of nodes, each of the nodes being operably connected to a bus. A transmitting node of the plurality of nodes is configured to communicate in accordance with a predetermined protocol a data communication having a predetermined frame structure via the bus to a receiving node of the plurality of nodes, which is configured to receive the data communication. Each data communication contains information to be communicated. The receiving node is configured to determine from the data communication a compromised state of the transmitting node and to initiate a response strategy. The transmitting node is configured to disassociate from the bus in accordance with the response strategy by incrementing an error counter, wherein the error types include bit error, form error and acknowledgment error.

In another non-limiting exemplary embodiment, a communication network includes a plurality of nodes, each of the nodes being operably connected to a bus. A transmitting node of the plurality of nodes is configured to communicate in accordance with a predetermined protocol a data communication having a predetermined frame structure via the bus to a receiving node of the plurality of nodes, which is configured to receive the data communication. Each data communication contains information to be communicated. Each of the nodes is configured to determine from the data communication a compromised state of the transmitting node and to initiate a response strategy. The transmitting node is configured to disassociate from the bus in accordance with the response strategy.

In another non-limiting exemplary embodiment, a communication network includes a plurality of nodes, each of the nodes being operably connected to a bus. A transmitting node of the plurality of nodes is configured to communicate in accordance with a predetermined protocol a data communication having a predetermined frame structure via the bus to a receiving node of the plurality of nodes, which is configured to receive the data communication. Each data communication contains information to be communicated. Each of the nodes is configured to determine from the data communication a compromised state of the transmitting node and to cooperate to initiate a response strategy. The transmitting node is configured to disassociate from the bus in accordance with the response strategy.

In another non-limiting exemplary embodiment, a communication network includes a plurality of nodes, each of the nodes being operably connected to a bus. A transmitting node of the plurality of nodes is configured to communicate in accordance with a predetermined protocol a data communication having a predetermined frame structure via the bus to a receiving node of the plurality of nodes, which is configured to receive the data communication. Each data communication contains information to be communicated. The receiving node is configured to determine from the data communication a compromised state of the transmitting node and to initiate a response strategy. The transmitting node is configured to disassociate from the bus in accordance with the response strategy. A node of the plurality of nodes is a master cybersecurity node, the master cyber security node being configured to implement the detection trigger and coordinated response strategy.

In another non-limiting exemplary embodiment, a communication network includes a plurality of nodes, each of the nodes being operably connected to a bus. A transmitting node of the plurality of nodes is configured to communicate in accordance with a predetermined protocol a data communication having a predetermined frame structure via the bus to a receiving node of the plurality of nodes, which is configured to receive the data communication. Each data communication contains information to be communicated. The receiving node is configured to determine from the data communication a compromised state of the transmitting node and to initiate a response strategy. The transmitting node is configured to disassociate from the bus in accordance with the response strategy, and the receiving node does not increment a receive error counter during execution of the response strategy.

In another non-limiting exemplary embodiment, a vehicle includes a communication network that includes a plurality of nodes, each of the nodes being operably connected to a bus. A transmitting node of the plurality of nodes is configured to communicate in accordance with a predetermined protocol a data communication having a predetermined frame structure via the bus to a receiving node of the plurality of nodes, which is configured to receive the data communication. Each data communication contains information to be communicated. The receiving node is configured to determine from the data communication a compromised state of the transmitting node and to initiate a response strategy. The transmitting node is configured to disassociate from the bus in accordance with the response strategy.

In another non-limiting exemplary embodiment, a vehicle includes communication network that includes a plurality of nodes, each of the nodes being operably connected to a bus. A transmitting node of the plurality of nodes is configured to communicate in accordance with a predetermined protocol a data communication having a predetermined frame structure via the bus to a receiving node of the plurality of nodes, which is configured to receive the data communication. Each data communication contains information to be communicated. The receiving node is configured to determine from the data communication a compromised state of the transmitting node and to initiate a response strategy. The transmitting node is configured to disassociate from the bus in accordance with the response strategy. The compromised state is the result of a cyber attack.

In another non-limiting embodiment, a method of actively responding to a cyber attack directed against a node coupled to a communication network includes receiving at an un-compromised node communicatively coupled to the network a communication from the node. A compromised state of the node is detected from the data communication, and the node is induced to communicatively disassociate from the network.

In another non-limiting embodiment, a method of actively responding to a cyber attack directed against a node coupled to a communication network includes receiving at an un-compromised node communicatively coupled to the network a communication from the node. A compromised state of the node is detected from the data communication, and the node is induced to communicatively disassociate from the network by entering a bus off state.

In another non-limiting embodiment, a method of actively responding to a cyber attack directed against a node coupled to a communication network includes receiving at an un-compromised node communicatively coupled to the network a communication from the node. A compromised state of the node is detected from the data communication, and the node is induced to communicatively disassociate from the network by incrementing a error counter.

In another non-limiting embodiment, a method of actively responding to a cyber attack directed against a node coupled to a communication network includes receiving at an un-compromised node communicatively coupled to the network a communication from the node. A compromised state of the node is detected from the data communication, and the plurality of un-compromised nodes induce the node to communicatively disassociate from the network.

In another non-limiting embodiment, a method of actively responding to a cyber attack directed against a node coupled to a communication network includes receiving at an un-compromised node communicatively coupled to the network a communication from the node. A compromised state of the node is detected from the data communication, and the plurality of un-compromised nodes induce the node to communicatively disassociate from the network in accordance with a response strategy.

In another non-limiting embodiment, a method of actively responding to a cyber attack directed against a node coupled to a communication network includes receiving at an un-compromised node communicatively coupled to the network a communication from the node. A compromised state of the node is detected from the data communication, and the node is induced to communicatively disassociate from the network by incrementing a error counter, while un-compromised suspend incrementing an error counter.

In another non-limiting embodiment, a method of actively responding to a cyber attack directed against a node coupled to a communication network includes receiving at an un-compromised node communicatively coupled to the network a communication from the node. A compromised state of the node due to a cyber attack is detected from the data communication, and the node is induced to communicatively disassociate from the network.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
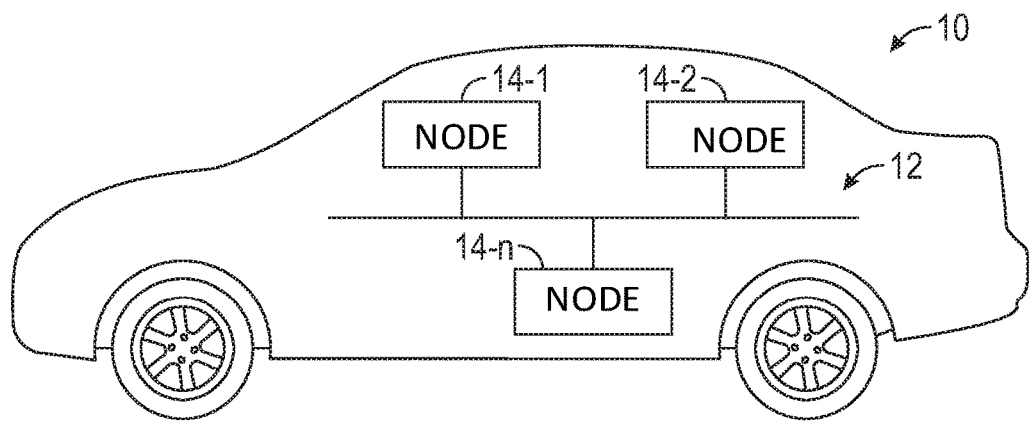
FIG. 1 is a graphic illustration of a vehicle including a communication network structure implementing a cyber attack response method in accordance with the herein described embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term system or module may refer to any combination or collection of mechanical and electrical hardware, software, firmware, electronic control component, processing logic, and/or processor device, individually or in any combination, including without limitation: application specific integrated circuit (ASIC), an electronic circuit, a processor (shared, dedicated, or group) that executes one or more software or firmware programs, memory to contain software or firmware instructions, a combinational logic circuit, and/or other suitable components that provide the described functionality.

Exemplary embodiments may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment of the invention may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the exemplary embodiments may be practiced in conjunction with any number of mechanical and/or electronic systems, and that the vehicle systems described herein are merely exemplary embodiment of possible implementations.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Referring to FIG. 1 a vehicle 10 includes a network structure 12 to which operably, communicatively coupled are a plurality of nodes, e.g., electronic control units (ECUs) (collectively referred to herein as ECUs 14 and individually as ECU 14-1, 14-2 through 14-n). Without limiting the generality of the herein described exemplary embodiments, the ECUs 14 may be one of the myriad ECUs typically deployed within a vehicle including powertrain/engine, active restraint, braking, chassis, body, infotainment, autonomous operation and the like, and each of the ECUs 14 may include one or more processors, memory containing firmware or software configured to affect operation of the processor to provide the required functionality. Furthermore, a node need not be an ECU, but it may be any electronic device or control capable of transmitting and/or receiving data in via the network 12. In this exemplary description, the network structure 12 may be configured as controller area network (CAN) to operate in accordance with the CAN network protocol, e.g., ISO 11898.

Configured in accordance with a common communication protocol, such as a CAN protocol, the network 12 incorporates a communication structure to provide an interchange of digital information making use of predefined framing formats, rules and standards to make communication effective between ECUs 14. The CAN Frame Structure is the required organization of bits to construct a complete data frame for transmission. The CAN Frame Structure includes Start of Frame (SOF), arbitration field (where the identifier is), Control Field, Data, cyclic redundancy check (CRC), Acknowledgment (Ack), End of Frame (EOF) and ITM. A data link layer (DLL) provides services for transferring frames to the physical layer. It manages the protocol of the bus system (bit timing, arbitration, error detection, etc.). The DLL receives a string of bits from the Physical Layer, performs error checking, removes protocol information and passes the data and identifier to the Network Layer. Conversely, the DLL accepts data and associated identifier information on a frame basis from the Network Layer, adds CAN protocol information and passes it to the Physical Layer on a bit-by-bit basis.

Figure 2:
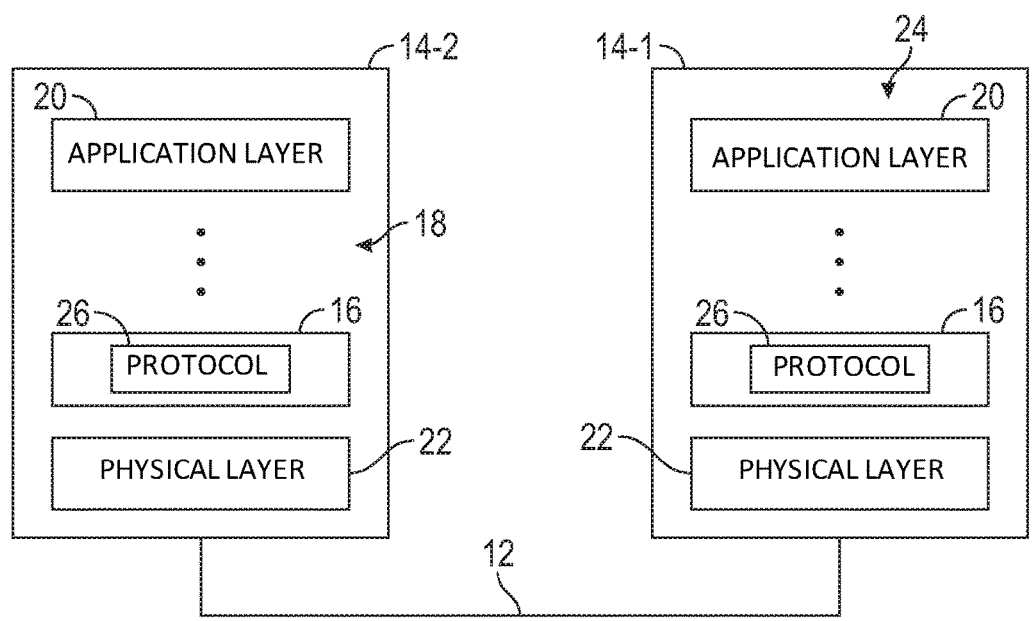
FIG. 2 is a block diagram illustration of a communication network architecture including a cyber attack response methodology in accordance with the herein described embodiments.

In the exemplary embodiments, therefore, the ECUs 14 may accordingly implement a CAN data link layer 16 (FIG. 2). The communication structure which may include a CAN data frame format, which as per ISO11898-1 may include classic CAN 2.0A, CAN 2.0B extended frame and CAN Flexible Data Rate frame formats. In further accordance with the CAN protocol, ECU's 14 implement what may be considered to be a fault confinement/error management strategy adapted to preserve a high availability of data transmission even in the case of a node defect. Fault confinement/error management also are typically part of the data link layer of communication protocol based on the OSI (Open Systems Interconnection) model.

Referring to FIG. 2, and as alluded to above, the ECUs 14 implement a layered architecture 18, which is depicted graphically. An application layer 20 resides above various additional layers, such as presentation, session, transport and network layers (not depicted). The lower layers of the architecture include the data link layer 16 and the physical layer 22. The physical layer 22 provides the communication interconnection of the ECUs 14 to the network 12.

The application layer 20 incorporates all application specific software that implements the ECU 14 features and functions. It is also an application layer that could be subject to a cyber attack 24. The cyber attack 24 is carried though the layered architecture 18, and is communicated within data frames communicated by the ECU 14-1 via the network 12 to ECU 14-2, for example.

In accordance with the herein described exemplary embodiments, the ECUs 14 are configured to include an embedded method 26 as part of the data link layer 16 to respond actively to the cyber attack 24. The embedded protocol 26 may be incorporated as a modification of the CAN protocol defined fault confinement/error management strategy within the data link layer 16. Advantageously, the attack response method 26 is provided independent of the application software and the application layer 20. In this regard, the method 26 may be implemented independent of the controller configuration within the ECUs 14 or whether the ECUs 14 incorporates a separate processor for network functionality. In exemplary embodiment, the method 26 may implement an intrusion detection system. Additional triggers may include detecting message authentication failures, constantly monitoring the periodicity of the received frames and detecting abnormal situations. One example of an abnormal situation is where the periodicity changes significantly, e.g., CAN frame periodicity changing from 100 milliseconds (ms) to 10 ms.

With continued reference to FIG. 2, ECU 14-2 is operable to detect the cyber attack 24 has occurred and that the ECU 14-1 is compromised as a result of the attack. The ECU 14-2 operates in accordance with the method 26 to induce ECU 14-1 to remove itself from the network 12. The ECU 14-1 may be induced to remove itself from the network 12 by perceiving errors in the manner it is operating, e.g., such as defined by the CAN fault confinement/error management strategy, or other suitable fault containment strategy as may be defined as part of the network protocol, such that it removes itself from the network 12.

Figure 3:
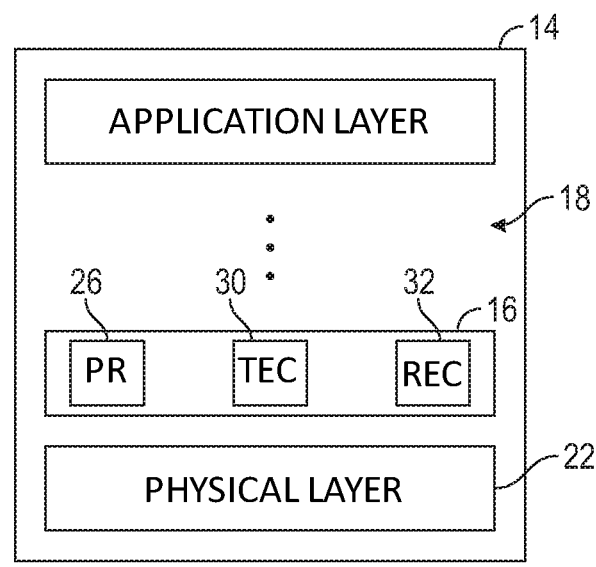
FIG. 3 is a block diagram of a communication network element in accordance with herein described exemplary embodiments.

With reference to the block diagram of FIG. 3 each ECU 14 maintains a transmit error counter (TEC) 30 and a receive error counter (REC) 32, which may be maintained within the data link layer 16 (as depicted) or elsewhere within the ECU 14. The TEC 30 is incremented by a value, e.g., 8, each time the ECU 14 detects a transmit error and decrements by a value, e.g., 1, with each successful transmission. Similarly, the REC 32 is incremented by a value, e.g., 8, each time the ECU detects a receive error and decrements by a value, e.g., 1, with each successful reception. Should the TEC 30 exceed a value, e.g., 255, the associated ECU 14 enters a bus off state. In the bus off state the ECU 14 neither transmits nor receives frames. The CAN protocol, as most communication network protocols, defines a number of error types, and furthermore whether the error is detected as a transmit error causing the TEC 30 to increment, or a receive error causing the REC 32 to increment. Typical error types include Bit, Form, Cyclic Redundancy Check (CRC), Stuff and Acknowledge (Ack) Errors.

Figure 4:
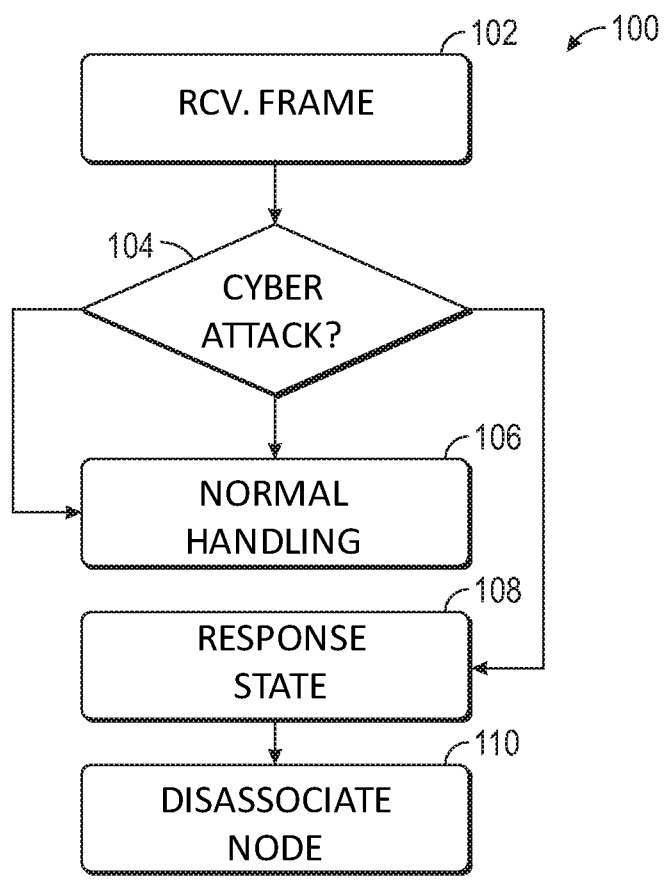
FIG. 4 is a flowchart illustration of a method of communicating data via a network with active cyber attack response.

With reference to FIGS. 2 and 4, in a method 100 of actively responding to a cyber attack directed against a node coupled to a communication network ECU 14-2 receives a transmitted data frame, 102. If there is no indication that the transmitting ECU 14-1 is compromised by a cyber attack, 104, the ECU 14-2 handles the received data frame normally, 106. However, if from the received data frame, e.g., failing on message authentication or triggering an aspect of an embedded intrusion detection system, such as unusual changes in CAN frame periodicity, the receiving ECU 14-2 determines the transmitting ECU 14-1 is compromised as a result of a cyber attack (104), the receiving ECU 14-2 enters a cyber active response state 108. In another embodiment, ECU 14.2 is not the master cybersecurity ECU. If ECU 14.2 receives a trigger from an external cybersecurity master ECU (on 104), then it would also make ECU 14.2 enter a cyber active response state 108 even if ECU 14.2 did not detect any message authentication issues or anomaly.

In the cyber active response state 108, the ECU 14-2 may signal all unaffected ECUs 14 to enter a cyber active response state 108 and identify the compromised ECU, e.g., ECU 14-1. In the cyber active response state 108, the unaffected ECUs 14 induce the compromised ECU 14-1 to disassociate from the network, 110. For example, the unaffected ECUs 14 may stop acknowledging data frames received from the compromised ECU 14-1. This has the effect of causing the compromised ECU 14-1 to register transmit Ack Errors, and incur a rapid incrementation of its TEC 30. Once the TEC 30 of the compromised ECU 14-1 exceeds the threshold, it enters the bus off state. In the bus off state, the compromised ECU 14-1 neither receives nor transmits data and is effectively isolated from the network 12. As will be appreciated, and in exemplary implementations, the method 100 quickly induces the defective ECU 14-1 to enter bus off state once the TEC 30 of the defective ECU 14-1 exceeds a threshold. The quick response results from all non-defective ECUs 14 stopping acknowledgement of the defective ECU 14-1 CAN frames based upon, e.g., the "source address" field within the CAN data frame identifier such as a CAN 2.0B 29-bit identifier of a SAE J1939 based commercial vehicle application.

In alternative or addition to not acknowledging data from the compromised ECU 14-1, the unaffected ECUs 14 may alter or over write bits within a transmitted data frame, which will induce the compromised ECU 14-1 to register Bit Errors. In such a scenario, however, the receiving, unaffected ECUs 14 recognize the action of over writing bits in the transmitted frame is in accordance with the method 26 and suspend incrementing its individual receive error counters (REC 32) when detecting non-compliant network protocol activity.

In an alternative arrangement in accordance with the herein described exemplary embodiments, one of the ECUs 14, may be a Master Cyber Security ECU 14. The Master Cyber Security ECU 14 is provided with a vehicle data dictionary to all sending and receiving ECUs 14 associated with a data frame. The Master Cyber Security ECU 14 is then configured to overwrite all data frames from the compromised ECU 14 (e.g., ECU 14-1 FIG. 2) with dominant bits. This will eventually make the compromised ECU 14-1 register Bit Errors, yet via the elegance of fine tuning the overwrite technique avoids other defect-free ECUs 14 from detecting Stuff Errors, e.g., in case legacy ECUs on the bus do not implement the herein described capability then these legacy ECUs do not increment their REC counters when the cyber active response state 108 is announced. The Master Cyber Security ECU 14 may also overwrite data frames by specifically altering a fixed-form bits with an illegal value (i.e. writing a dominant bit where a recessive is expected according to the communication protocol) causing the compromised ECU 14-1 to incur Form Errors. To avoid incurring errors within unaffected ECUs 14, in the cyber active response state, e.g. a "Cybersecurity Mode," unaffected ECUs 14 may be caused to ignore various data frame errors such as Bit Error and Stuff Error until the compromised ECU 14-1 has entered the bus off state, and the cyber active response state is terminated. Once a defective ECU 14 is disconnected, the system must be mindful that the defective ECU 14 may rejoin the network, e.g, by returning to the Error Active state after resetting the hardware and detecting 128 occurrences of 11 consecutive bits, by successful receptions or an idle bus. Therefore, characteristics of the attack may be communicated via known techniques to an external back office, central station or other location from which final remediation may be implemented.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A communication network comprising:
a plurality of nodes, each of the nodes being operably connected to a bus, a transmitting node of the plurality of nodes being configured to communicate in accordance with a predetermined protocol a data communication having a predetermined frame structure via the bus to a receiving node of the plurality of nodes, which is configured to receive the data communication,
wherein each data communication contains information to be communicated, and
the receiving node is configured to determine from the data communication a compromised state of the transmitting node and to initiate a response strategy, and the transmitting node being configured to disassociate from the bus in accordance with the response strategy, wherein
in accordance with the response strategy the receiving node is configured to induce the transmitting node to dissociate from the bus by being configured to engage in communication activity of a nature to be perceived by the transmitting node as if the transmitting node has generated communication errors such that the transmitting node self-determines to dissociate from the bus in accordance with the predetermined protocol.

2. The communication network of claim 1, wherein the compromised state is a result of a cyber attack.

3. The communication network of claim 1, wherein the transmitting node is induced to enter a bus off state in accordance with the response strategy.

4. The communication network of claim 1, wherein in accordance with the response strategy the transmitting node is configured to increment an error counter such that the transmitting node operably disconnects from the bus in accordance with the response strategy.

5. The communication network of claim 4, wherein the transmitting node is induced to increment an error count, the error counter being in excess of a protocol threshold.

6. The communication network of claim 5, wherein the bus comprises a Controller Area Network (CAN) bus, and the error counter is a transmission error counter (TEC).

7. The communication network of claim 6, wherein the induced errors comprise at least one of: a bit error, a form error and an acknowledgement (ACK) error.

8. The communication network of claim 1, each of the nodes of the plurality of nodes other than the transmitting node being configured to determine the compromised state of the transmitting node and to invoke the response strategy.

9. The communication network of claim 1, a group of the plurality of the nodes other than the transmitting node being configured to cooperate to implement the response strategy.

10. The communication network of claim 1, wherein a node of the plurality of nodes is a master cybersecurity node, the master cyber security node being configured to implement the response strategy.

11. The communication network of claim 1, wherein the receiving node does not increment a receive error counter during execution of the response strategy.

12. A vehicle comprising:
a communication network including a plurality of nodes each of the nodes being operably connected to a bus, a transmitting node of the plurality of nodes being configured to communicate in accordance with a predetermined protocol a data communication having a predetermined frame structure via the bus to a receiving node of the plurality of nodes, which is configured to receive the data communication,
wherein each data communication contains information to be communicated, and
the receiving node is configured to determine from the data communication a compromised state of the transmitting node and to initiate a response strategy, and the transmitting node being configured to disassociate from the bus in accordance with the response strategy, wherein in accordance with the response strategy the receiving node is configured to induce the transmitting node to dissociate from the bus by being configured to engage in communication activity of a nature to be perceived by the transmitting node as if the transmitting node has generated communication errors such that the transmitting node self-determines to dissociate from the bus in accordance with the predetermined protocol.

13. The vehicle of claim 12, wherein the compromised state is a result of a cyber attack.

14. A method of actively responding to a cyber attack directed against a node coupled to a communication network, the method comprising:

receiving at an un-compromised node communicatively coupled to the network a communication from the node;

detecting from the communication that the node is a compromised node; and inducing the compromised node to communicatively disassociate from the network by engaging in communication activity of a nature to be perceived by the compromised node as if the compromised node has generated communication errors such that the node self-determines to dissociate from the bus in accordance with the predetermined protocol.

15. The method of claim 14, wherein inducing the compromised node to communicatively disassociate from the network comprises inducing the compromised node to enter a bus off state.

16. The method of claim 14, wherein inducing the compromised node to communicatively disassociate from the network comprises inducing the compromised node into incrementing an error counter.

17. The method of claim 14, wherein inducing the compromised node to communicatively disassociate from the network comprises communicating with additional un-compromised nodes.

18. The method of claim 14, further comprising initiating a response strategy, and inducing the compromised node to communicatively dissociate from the network in accordance with the response strategy.

19. The method of claim 18, further comprising not incrementing a receive error counter at the un-compromised node in accordance with the response strategy.

20. The method of claim 14, wherein detecting from the communication that the node is a compromised node comprises detecting a cyber attack directed at the node.

* * * * *